(12) United States Patent
Adams et al.

(10) Patent No.: US 8,583,937 B2
(45) Date of Patent: Nov. 12, 2013

(54) METHOD AND APPARATUS FOR SECURING A COMPUTING DEVICE

(75) Inventors: Neil Patrick Adams, Kitchener (CA); Herbert Anthony Little, Waterloo (CA); Van Quy Tu, Kitchener (CA)

(73) Assignee: BlackBerry Limited, Waterloo, ON (CA)

( * ) Notice: Subject to any disclaimer, the term of this patent is extended or adjusted under 35 U.S.C. 154(b) by 166 days.

(21) Appl. No.: 12/969,707

(22) Filed: Dec. 16, 2010

(65) Prior Publication Data

US 2012/0159183 A1 Jun. 21, 2012

(51) Int. Cl.
*G06F 21/00* (2013.01)

(52) U.S. Cl.
USPC .......................................................... 713/189

(58) Field of Classification Search
USPC .................................. 713/189, 194
See application file for complete search history.

(56) References Cited

U.S. PATENT DOCUMENTS

| | | | |
|---|---|---|---|
| 7,111,321 B1 * | 9/2006 | Watts et al. ........................ | 726/2 |
| 7,835,721 B2 | 11/2010 | Tuulos et al. | |
| 2003/0097596 A1 | 5/2003 | Muratov et al. | |
| 2003/0140246 A1 | 7/2003 | Kammer et al. | |
| 2005/0216765 A1 * | 9/2005 | Petkus et al. ................. | 713/201 |
| 2008/0222127 A1 * | 9/2008 | Bergin .............................. | 707/5 |

FOREIGN PATENT DOCUMENTS

| | | |
|---|---|---|
| EP | 1 848 174 A1 | 10/2007 |
| GB | 2 345 229 A | 6/2000 |
| GB | 2 358 560 A | 7/2001 |
| WO | 01/08435 A1 | 2/2001 |
| WO | 01/55821 A2 | 8/2001 |
| WO | 2009/140646 A1 | 11/2009 |

OTHER PUBLICATIONS http://www.aikosolutions.com/products/secubox-for-pocket-pc/features download date Oct. 21, 2010.
http://www.aikosolutions.com/encryption/how-secubox-encrypts-data/ downloaded Oct. 21, 21010.
http://www.freeotfe.org/features.html downloaded Oct. 21, 2010.
http://en.wikipedia.org/wiki/FreeOTFE downloaded Oct. 21, 2010.
http://www.freeotfe.org/screenshots pda.html downloaded Oct. 21, 2010.
http://technofriends.in/2009/01/14/freeware-encrypt-your-disks-with-truecrypt/ downloaded Oct. 21, 2010.
European Patent Application No. 10195405.5 Search Report mailed dated Mar. 16, 2011.
European Patent Application No. 10195405.5 Examination Report dated Jul. 10, 2012.
Canadian Patent Application No. 2761219 Examination Report dated Sep. 4, 2013.

* cited by examiner

*Primary Examiner* — Brandon Hoffman
*Assistant Examiner* — Anthony Brown
(74) *Attorney, Agent, or Firm* — Perry + Currier (57) ABSTRACT

A method and apparatus for securing a computing device are provided. A state of the computing device is determined, the state associated with a protection state. The computing device is automatically switching between a plurality of security levels at based on the state.

19 Claims, 5 Drawing Sheets

| CP Level \ Password State | No Password | Password Unlocked | Password Locked |
|---|---|---|---|
| CP Off | None | None | None |
| CP Strong | None | 137'a (AES-a) | 137'c (AES-c) |
| CP Stronger | None | 137'b (AES-b) | 137'c (AES-c) |
| CP Strongest | None | 137'c (AES-c) | 137'c (AES-c) |

Fig. 5

METHOD AND APPARATUS FOR SECURING A COMPUTING DEVICE

FIELD

The specification relates generally to cryptography and specifically to a method and apparatus for securing a computing device

BACKGROUND

The evolution of computers is currently quite active in the mobile device environment. It is now well-known to encrypt in mobile devices. More recently, there has been a veritable explosion of the number and type of applications that are configured to the unique form factors and computing environments of mobile devices.

SUMMARY

An aspect of the specification provides a method for securing a computing device, comprising: determining a state of the computing device, the state associated with protection state; and automatically switching between a plurality of security levels at the computing device based on the state.

Determining the state of the computing device can comprise at least one of: determining a current operating mode of the computing device; determining a current lock-state of the computing device; determining whether the computing device is currently password protected or not password protected; determining a length of a password protecting the computing device; determining a password attempt limit number at the computing device; determining a message source of a message received at the computing device; determining a message service associated with the computing device; determining whether an action associated with the computing device is associated with a business account or a personal account; determining a message classification of the message received at the computing device; determining a current IT (Information Technology) policy associated with the computing device; determining a current location of the computing device; and, determining a type of a data share currently connected to the computing device Each successive one of the plurality of security levels can be associated with a respective successive one of a plurality of encryption algorithms, and each successive encryption algorithm of the plurality of encryption algorithms can comprise successively more electronic countermeasures than a previous encryption algorithm of the plurality of encryption algorithms. Protection of the computing device can decrease in successive security levels, and a quantity of electronic countermeasures can correspondingly increase in each the successive encryption algorithm. Each successive encryption algorithm can be slower than a previous one of the plurality of encryption algorithms. A first encryption algorithm of the plurality of encryption algorithms can comprise a smallest quantity of electronic countermeasures and a last encryption algorithm of the plurality of encryption algorithm can comprise a largest quantity of electronic countermeasures.

The computing device can be in one of a plurality of states, and determining the state of the computing device can comprise determining a current one of the plurality of states.

Automatically switching between the plurality of security levels on the computing device based on the state can comprise selecting one of a plurality of encryption algorithms for encrypting data at the computing device. Each of the plurality of encryption algorithms can comprise an associated AES (Advanced Encryption Standard) algorithm.

Determining the state of the computing device can comprise determining whether the computing device is locked or unlocked, and automatically switching between the plurality of security levels on the computing device based on the state can comprise: using a first encryption algorithm to encrypt the data at the computing device when the computing device is unlocked; and, using a second encryption algorithm to encrypt data when the computing device is locked, the second encryption algorithm comprising more electronic countermeasures than the first encryption algorithm.

The computing device can comprise a mobile computing device.

Another aspect of the specification provides a computing device having security measures, comprising: a processing unit interconnected with a memory, the processing unit enabled to: determine a state of the computing device, the state associated with a protection state; and automatically switch between a plurality of security levels at the computing device based on the state.

The processing unit can be further enabled to determine the state of the computing device by at least one of: determining a pre-determined content protection level of the computing device; determining a current lock-state of the computing device; determining whether the computing device is currently password protected or not password protected; determining a length of a password protecting the computing device; determining a password attempt limit number at the computing device; determining a message source of a message received at the computing device; determining a message service associated with the computing device; determining whether an action associated with the computing device is associated with a business account or a personal account; determining a message classification of the message received at the computing device; determining a current IT (Information Technology) policy associated with the computing device; determining a current location of the computing device; and, determining a type of a data share currently connected to the computing device Each successive one of the plurality of security levels can be associated with a respective successive one of a plurality of encryption algorithms, and each successive encryption algorithm of the plurality of encryption algorithms can comprise successively more electronic countermeasures than a previous encryption algorithm of the plurality of encryption algorithms. Protection of said computing device can decrease in successive security levels, and a quantity of electronic countermeasures can correspondingly increase in each the successive encryption algorithm. Each successive encryption algorithm can be slower than a previous one of the plurality of encryption algorithms. A first encryption algorithm of the plurality of encryption algorithms can comprise a smallest quantity of electronic countermeasures and a last encryption algorithm of the plurality of encryption algorithm can comprise a largest quantity of electronic countermeasures.

The computing device can be in one of a plurality of states, and the processing unit can be further enabled to determine the state of the computing device by determining a current one of the plurality of states. The processing unit can be further enabled to automatically switch between the plurality of security levels on the computing device based on the state by selecting one of a plurality of encryption algorithms for encrypting data at the computing device. Each of the plurality of encryption algorithms can comprise an associated AES (Advanced Encryption Standard) algorithm.

The processing unit can be further enabled to: determine the state of the computing device by determining whether the computing device is locked or unlocked; and automatically switch between the plurality of security levels on the computing device based on the state by: using a first encryption algorithm to encrypt the data at the computing device when the computing device is unlocked; and, using a second encryption algorithm to encrypt data when the computing device is locked, the second encryption algorithm comprising more electronic countermeasures than the first encryption algorithm.

The computing device can comprise a mobile computing device.

A further aspect of the specification provides a non-transitory computer program product, comprising a computer usable medium having a computer readable program code adapted to be executed to implement a method for securing a computing device, comprising: determining a state of the computing device, the state associated with protection state; and automatically switching between a plurality of security levels at the computing device based on the state.

BRIEF DESCRIPTIONS OF THE DRAWINGS

For a better understanding of the various embodiments described herein and to show more clearly how they may be carried into effect, reference will now be made, by way of example only, to the accompanying drawings in which.

DETAILED DESCRIPTION

Figure 1:
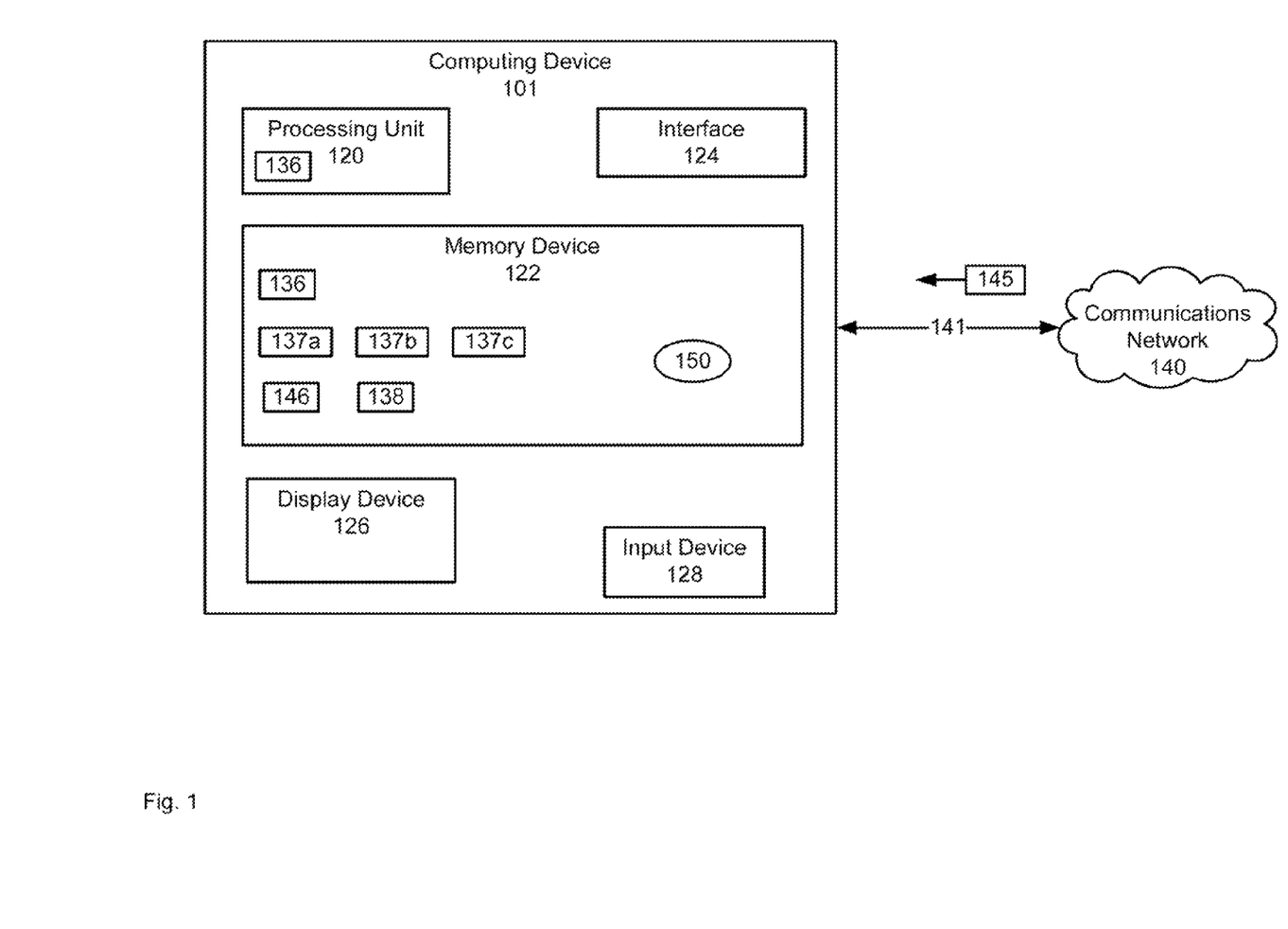
FIG. 1 depicts a computing device which can automatically switch between a plurality of security levels, according to non-limiting implementations.

FIG. 1 depicts a computing device 101 which can automatically switch between a plurality of security levels, according to non-limiting implementations. Computing device 101 will also be referred to hereafter as device 101. Device 101 comprises a processing unit 120 interconnected with a memory device 122, a communication interface 124, a display device 126 and an input device 128, for example via a computing bus (not depicted). Memory device 122, communication interface 124, and display device 126 will also be referred to hereafter as, respectively, memory 122, interface 124 and display 126. Device 101 further comprises an application 136 for determining a state of device 101 and automatically switching between a plurality of security levels based on the state, as will be explained below. Application 136 can be stored in memory 122 and processed by processing unit 120.

Further, memory 122 stores a plurality of encryption algorithms 137a, 137b, 137c (generically an algorithm 137 and collectively algorithms 137). While three (3) algorithms 137 are described herein, it is appreciated that the any suitable quantity of algorithms are within the scope of present implementations. Application 136 automatically causes one of algorithms 137 to be selected for encrypting data based on a determined state of device 101, the determined state of device 101 associated with protection state, as will be explained in further detail below.

For example, as will also be explained further below, device 101 can be locked in a first state and unlocked in second state: e.g. memory 122 can store a password 138 (and/or a hash thereof); device 101 can be unlocked via receipt of data from input device 128 (e.g. via an "Enter Password" Graphic User Interface (GUI) and/or an unlock device application); device 101 is unlocked when the input data matches password 138, and NOT unlocked when the input data does not match password 138. In these implementations, a respective algorithm 137 is selected for encrypting data based on whether device 101 is locked or unlocked.

In general it is appreciated that when device 101 is locked, the protection state of device 101 can be lower than when device 101 is unlocked. There is an underlying assumption that when device 101 is unlocked, device 101 is physically secure and in the possession of a user that knows password 138, and hence the protection state is such that device 101 can be considered well protected. Similarly, when device 101 is locked, the underlying assumption is that device 101 can be in the possession of anyone and hence it is more likely that device 101 is not physically secure (e.g. device can have been lost, misplaced, stolen or the like), and hence the protection state is such that device 101 can be considered poorly protected. As such, it is desirable to automatically select an algorithm 137 to encrypt data which provides more security when device 101 is locked than when device 101 is unlocked.

For example, each algorithm 137 can comprise respective electronic countermeasures (ECM). When the protection state of device 101 is poor, than an algorithm 137 having a large quantity/amount of ECM can be automatically selected to encrypt data at device 101 (and/or decrypt data at device 101 as in some implementations device 101 can also decrypt data when locked); and when the protection state of device 101 is good, than an algorithm 137 having a smaller quantity/amount of ECM can be automatically selected to encrypt data at device 101.

Selection of a given algorithm 137 can also represent a trade-off between performance of device 101 and a selected protection state. In other words, as the quantity/amount of ECM applied to data at device 101 increases, the resources used at device 101 to apply the ECM increases (e.g. the computational power for ECM increases), which affects the overall performance of device 101. Such a trade-off between ECM and performance can however be acceptable as device 101 transitions through different states/protection states.

In non-limiting example implementations, each algorithm 137 can comprise a respective AES (Advanced Encryption Standard) algorithm, each with differing associated amounts/quantities of ECM and different associated speeds. For example, consider implementations where each of the three algorithms 137 is an AES algorithm, nominally referred to herein as AES-a, AES-b, AES-c, which can be summarized as follows with respect to speed vs. performance:

i—AES-a: Really fast AES (can also be implemented in hardware as well as software) with no ECM; weaker encryption but better performance in device 101;

ii—AES-b: Fast AES with some ECM; stronger encryption than AES-a, with associated better/increased security, but performance of device 101 slows somewhat;

iii—AES-c: Slower AES with lots of ECM, and hence an increase in security over AES-b, but can significantly decrease performance of device 101 as compared to AES-a and AES-b.

However, by automatically switching between these AES algorithms depending on the state/protection state of device 101, the performance of the device 101 can be improved by using weaker encryption (e.g. AES-a or AES-b) when the protection state of device 101 is good, than by using, for example, a monolithic AES-c approach to encryption. In turn, when the protection state of device 101 is poor, then a stronger encryption algorithm with more ECM (e.g. AES-c) can be used to encrypt data.

It is further appreciated, that ECM in each algorithm 137 can comprise any suitable quantity and/or amount of ECM, including but not limited to no ECM for the least secure of algorithms 137. Further, ECM in each algorithm 137 can comprise any suitable type of ECM, including but not limited to ECM for masking encryption keys using at least one of random masks and lookup tables and/or using stirred tables. Other types of ECM are within the scope of present implementations. It is appreciated that, in general, ECM are meant to prevent power analysis attacks on device 101. In some implementations, ECM can comprise randomizing data and the operations of device 101 in a way that no pattern can be seen from the electro magnetic waves emanating from processing unit 120. Further, it is appreciated that ECM could be considered as a specific form of Cryptographic Power Analysis Protection (CPAP). As such, it will be appreciated that the algorithms may be different according to the degree of CPAP associated therewith.

Device 101 can be further enabled to access communication network 140, which will also be referred to hereafter as network 140, via interface 124 and a link 141. Network 140 can comprise any suitable combination of wired or wireless communication network, including but not limited to analog networks, packet based networks, the internet, a local area network (LAN), a wireless local area network (WLAN), a wide area network (WAN), analog networks, the PSTN (public switched telephone network), cell-phone networks (including but not limited to CDMA (Code division multiple access), GSM (Global System for Mobile communications), UTMS (Universal Mobile Telecommunications System), 1X, Edge and the like), WiFi and WiMax networks.

Similarly, link 141 can comprise any suitable link for connecting to and/or communicating with network 140, including any suitable combination of cables (such as USB/serial cables) and/or access points for wired and/or wireless communication with network 140, such as WiFi access points, WiMax access points, cell phone access points, and the like.

In general, it is appreciated that data 145 can be received at device 101 via network 140 and/or link 141, for example from a remote computing device and/or a remote data service and/or a remote data share. Further, data 145 can be received at device 101 while device 101 is in each one of a plurality of states. For example, in a first state device 101 can be locked and in second state device 101 can be unlocked. It is appreciated that data 145 can be received at device 101 while device 101 is locked or unlocked. It is yet further appreciated that algorithm 137 is selected for encrypting data 145 based on whether device 101 is locked or unlocked. In general, data 145 can be encrypted to produce encrypted data 146 which is stored in memory 122.

In some implementations, device 101 can comprise a relational table 150 storing relationships between states of device 101 and security levels and/or algorithms 137, as will be described below. In some implementations, table 150 can be stored in a database.

In general, device 101 comprises any computing device suitable for processing application 136, including but not limited to any suitable combination of personal computers, laptop computers, portable electronic devices, mobile computing devices, portable computing devices, tablet computing devices, laptop computing devices, PDAs (personal digital assistants), cellphones, smartphones and the like. Other suitable computing devices are within the scope of present implementations.

Processing unit 120 comprises any suitable processor, or combination of processors, including but not limited to a microprocessor, a central processing unit (CPU) and the like. Other suitable processing units are within the scope of present implementations.

Memory 122 can comprise any suitable memory device, including but not limited to any suitable one of, or combination of, volatile memory, non-volatile memory, random access memory (RAM), read-only memory (ROM), hard drive, optical drive, flash memory, magnetic computer storage devices (e.g. hard disks, floppy disks, and magnetic tape), optical discs, and the like. Other suitable memory devices are within the scope of present implementations. In particular, memory 122 is enabled to store application 136, algorithms 137, as well as password 138, data 145 and/or encrypted data 146, and table 150, as will be described below.

Communication interface 124 comprises any suitable communication interface, or combination of communication interfaces. In particular interface 124 is enabled to communicate wirelessly with network 140 via link 141. Accordingly, interface 124 is enabled to communicate according to any suitable protocol which is compatible with network 140, including but not limited to wired and/or wireless protocols, analog protocols, packet-based protocols, internet protocols, WAN protocols, LAN protocols, PSTN protocols, cell-phone protocols, wireless data protocols, GSM protocols, UTMS protocols, WiFi protocols, WiMax protocols, near field communication (NFC) protocols, Bluetooth® protocols, access point protocols, and/or a combination, or the like. Other suitable communication interfaces and/or protocols are within the scope of present implementations.

Input device 128 is generally enabled to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present implementations.

Display 126 comprises any suitable one of or combination of CRT (cathode ray tube) and/or flat panel displays (e.g. LCD (liquid crystal display), plasma, OLED (organic light emitting diode), capacitive or resistive touchscreens, and the like).

Figure 2:
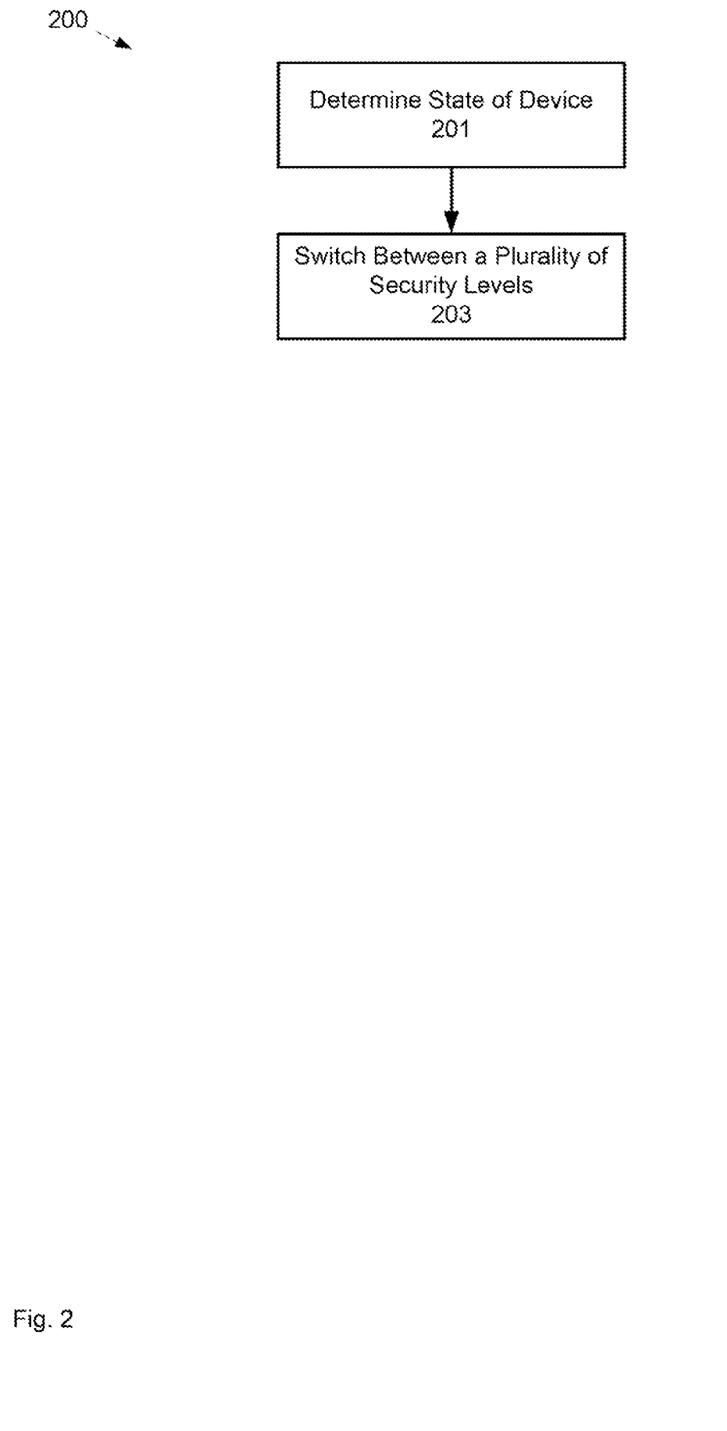
FIG. 2 depicts a method for automatically switching between a plurality of security levels at a computing device, according to non-limiting implementations.

Attention is now directed to FIG. 2 which depicts a method 200 for securing a computing device. In order to assist in the explanation of method 200, it will be assumed that method 200 is performed using device 101. Furthermore, the following discussion of method 200 will lead to a further understanding of device 101 and its various components. However, it is to be understood that device 101 and/or method 200 can be varied, and need not work exactly as discussed herein in conjunction with each other, and that such variations are within the scope of present embodiments.

It is appreciated that method 200 can be implemented in device 101 by processing unit 120 processing application 136.

At block 201, a state of device 101 is determined, the state of device 101 associated with a protection state of device 101. At block 203, device 101 is automatically switched between a plurality of security levels based on the state determined at block 201.

For example, device 101 can be in one of a plurality of states, each associated with a respective protection state, and determining state of device 101 at block 201 can comprise determining a current one of the plurality of states. For example, successive states of the plurality of states can be associated with an increasing or decreasing protection state.

In a particular non-limiting example, a device 101 can be in locked in a first state and unlocked in a second state. The locking can comprise any suitable combination of software and/or hardware locks. In specific implementations, the locking can be a software based lock and the state of device 101 can be changed from locked to unlocked upon receipt of input data matching password 138. It is appreciated that when the input data matching password 138 is received, and device 101 is unlocked, the protection state of device 101 is considered to be good as there is a presumption that device 101 is in possession of a user that knows password 138. Similarly, it can be assumed that when device 101 is locked, the protection state of device 101 is poor as if device 101 is stolen, misplaced, lost or the like, presumably device 101 will be in a locked state as someone attempting to gain access to device 101 will not know password 138.

However, while in the non-limiting example the plurality of states is based on the device being locked or unlocked, in other implementations, determining a state of device 101 at block 201 can comprise at least one of: determining a current lock-state of device 101; determining a pre-determined content protection level of device 101; determining whether device 101 is currently password protected or not password protected; determining a length of a password protecting device; determining a password attempt limit number at device 101; determining a message source of a message received at device 101; determining a message service associated with device 101; determining whether an action associated with device 101 is associated with a business account or a personal account; determining a message classification of message received at device 101; determining a current IT policy associated with device 101; determining a current location of device 101; determining a type of a data share currently connected to device 101; and/or a combination thereof.

It is further appreciated that device 101 being password protected is associated with a state where the protection state of device 101 is better than a state where device 101 not being password protected.

It is yet further appreciated that the longer password 138 is, the more likely device 101 is secure while in a locked state (i.e. the longer password 138 is, the more secure device 101 is when locked).

Similarly, when a limit on the number of password attempts is set to a first threshold value (e.g. 10 attempts), at device 101, it can be assumed that device 101 is in a better protection state than when a limit on the number of password attempts is set to a second smaller threshold value (e.g. 3 attempts). In other words, when the number of password attempts is set at or below a given threshold, the underlying assumption is that the protection state of device 101 is worse than when the number of password attempts is above the given threshold. Any suitable quantity of threshold values is within the scope of present implementations.

The protection state of device 101 can also be related to a message source of a message (such as data 145) received at device 101. For example, when device 101 receives messages from a known message source, device 101 can be determined to be in a good protection state, and when device 101 receives messages from an unknown message source, device 101 can be determined to be in a worse protection state. For example, when data 145 is associated with a source address and/or a source domain stored in a white list at device 101, it can be determined that the protection state of device 101 better than when the source address and/or the source domain is not stored in a white list. Hence, processing and/or storing data 145 can place device 101 in a more secure or less secure state depending on the message source.

Further, when data 145 is received from a message source stored in a black list, it can be determined that the protection state of device 101 is poor.

The protection state of device 101 can also be determined from whether a message service forwarding data 145 comprises a business based mail server or a consumer based mail server. In non-limiting implementations, it is understood that when data 145 is received from a business based mail server, the protection state of device 101 can be better than when received from a consumer based mail server. For example, when data 145 is received from a business based mail server, then device 101 can be in a secure business location; and when device 145 is received from a consumer based mail server, then device 101 can be in an unknown location which is assumed to be less secure than the business location. Hence, processing and/or storing data 145 can place device 101 in a more secure or less secure state depending on the message service.

It is yet further appreciated that location can be determined from a location of an access point that device 101 is using to access network 140. For example, when link 141 includes a WiFi access point, the location of device 101 can be determined from the location of the WiFi access point as it is understood that WiFi access points have a physical range. In general, accessing network 140 via an access point can be used as a heuristic to determine whether device 101 is in a given range as defined by the range of the access point. Any suitable access point is within the scope of present implementations, including but not limited to cell phone towers, WiMax access points and smart card readers.

The protection state of device 101 can also be determined from a message classification of a message (e.g. data 145) received at device 101, for example whether data 145 comprises spam and/or junk mail or not. It is appreciated that when data 145 is not spam and/or junk mail, the protection state of device 101 can be determined to be good (e.g. located behind appropriate firewalls and/or spam filters and/or junk mail filters); and when data 145 is spam and/or junk mail, the protection state of device 101 can be determined to be poor (e.g. not located behind appropriate firewalls and/or spam filters and/or junk mail filters).

The protection state of device 101 can also be determined from a current IT (Information Technology) policy associated with device 101 which can in turn dictate a state of device 101. For example, the IT policy can dictate the state of device 101 when locked and/or unlocked. In some implementations, IT policy can dictate the state of device 101 at a given time and/or under given conditions. The IT policy can be stored at device 101 and/or at an IT policy server. When stored at an IT policy server the IT policy can be determined via communication with the server, for example via network 140. In the prior art, the IT policy can dictate that device 101 has to wipe itself and/or contact an IT server after a given period of time; hence, alternatively, in some non-limiting implementations, rather than wipe itself, device 101 can automatically switch to the most secure one of algorithms 137 after the given period of time (and in yet further alternatives wipe itself after a second given period of time). Similarly, in the prior art, IT policy can dictate that device 101 has to wipe itself when a battery at device 101 has reached a certain level (e.g. the battery is dying); hence, alternatively, in some non-limiting implementations, rather than wipe itself, device 101 can automatically switch to the most secure one of algorithms 137 when the battery at device 101 has reached a given level, and in yet further alternatives wipe itself when the battery at device 101 has reached a second given level.

The protection state of device 101 can also be determined from a current location of device 101, determined for example from a GPS (Global Positioning System) device at device 101 (not depicted) and/or via triangulation methods. It is further appreciated that when device 101 is at least one predetermined given location (e.g. at home, at an office, or the like), the protection state of device 101 can be considered to better than when device 101 is not at one of the predetermined given locations (e.g. while travelling, in a public space, or the like).

The protection state of device 101 can also be determined from a type of a data share currently connected to device 101, such as a social network or a corporate network. In general it is appreciated that device 101 being connected to a social network device is in a protection state that is worse than a protection state of device 101 being connected to a corporate network.

It is appreciated that each protection state described above can also be related to a level of physical security of device 101. For example, device 101 can be considered more physically secure when unlocked with a password than when locked with a password as when unlocked, device 101 is understood to be in the possession of someone who knows the password; when locked, device 101 can potentially be lost or stolen. Similarly, when device 101 is password protected, device 101 can be considered less physically secure than when password protected. Further, a length of a password can indicate a level of physical security, device 101 with a longer password being more physically secure than a when device 101 has a shorter password. The password attempt limit number can also indicate a level of physical security with a larger number indicating that device 101 is more secure than a smaller number. The message source and/or classification of a message received at device 101 can also be indicative of physical security of device 101, with a business related message received, for example, from a business server indicating that device 101 is more secure than when a personal message is received from a commercial server. Similarly, a message service associated with device 101 can be indicative of a level of physical security of device 101, with device 101 being in communication with a business message service indicating that device 101 is more physically secure than when device 101 is in communication with a commercial message service. Similar reasoning applies when device 101 executes an action associated with a business account vs. a personal account and/or from a current location of device 101 and/or from a type of data share currently connected to device 101. An IT (Information Technology) policy associated with device 101 can also determine the physical security of device 101 as the IT policy can determine when device 101 is locked and/or unlocked, and/or the state of device 101 at a given time and/or under given conditions. Similarly, when content protection of device 101 is enabled, the level of content protection (e.g. strong, stronger, strongest, as described below), the level of content protection can indicate how physically secure device 101 is.

In any event, it is appreciated that device 101 can exist in at least one of a plurality of states, each associated with a respective protection state. It is further appreciated that the determination of which of the plurality of states device 101 is in can depend on one or more variables.

It is further appreciated that in block 203, device 101 can be automatically switched to one of a plurality of security levels based on the state of device 101.

For example, each of a plurality of security levels can be associated with a respective one of algorithms 137. Further, each of algorithms 137 can be stronger than a previous algorithm (i.e. providing stronger encryption when used to encrypt data such as data 145). In particular non-limiting implementations, strength of security level can be determined by the strength of an associated algorithm 137. Hence, each successive security level of the plurality of security levels can comprise an algorithm 137 with more ECM than an algorithm 137 of a previous security level.

For example, in implementations where algorithm 137a is associated with first security level, algorithm 137b is associated with a second security level and algorithm 137c is associated with a third security level, algorithm 137c can comprise more ECM than algorithm 137b, and algorithm 137b can comprise more ECM than algorithm 137a. Hence the first security level is associated with a fastest, though less secure one of algorithms 137 and the third security level is associated with slower though more secure one of algorithms 137. Hence, the third security level can provide stronger security then the first security level. Again, while only three algorithms 137 are provided herein it is appreciated that the quantity of algorithms 137 is not to be considered particularly limiting and further implementations can comprise any suitable quantity of algorithms 137 and associated security levels.

In any event, automatically switching between the plurality of security levels on device 101 based on the state of device 101 can comprise selecting one of algorithms 137 for encrypting data at device 101, such as data 145.

In particular non-limiting implementations, algorithms 137 can each comprise different types of AES (Advanced Encryption Standard) algorithms, as described above. For example algorithm 137a can comprise the AES-a encryption algorithm with no ECM, algorithm 137b can comprise the AES-b encryption algorithm with some ECM, and algorithm 137c can comprise the AES-c encryption algorithms with more ECM than AES-b.

It is further appreciated that each successive algorithm 137 (e.g. from algorithm 137a to algorithm 137c), has more ECM than a previous algorithm 137, with first algorithm 137a having the smallest amount of ECM and algorithm 137c having the greatest amount of ECM.

Further, it is appreciated that each successive state is associated with successively decreasing protection, and that each respective associated algorithm 137 correspondingly provides more ECM as a protection state of device 101 decreases/degrades. Further, each successive algorithm 137 is slower than a previous algorithm such that a trade-off occurs between performance of device 101 and security level of device 101.

Figure 3:
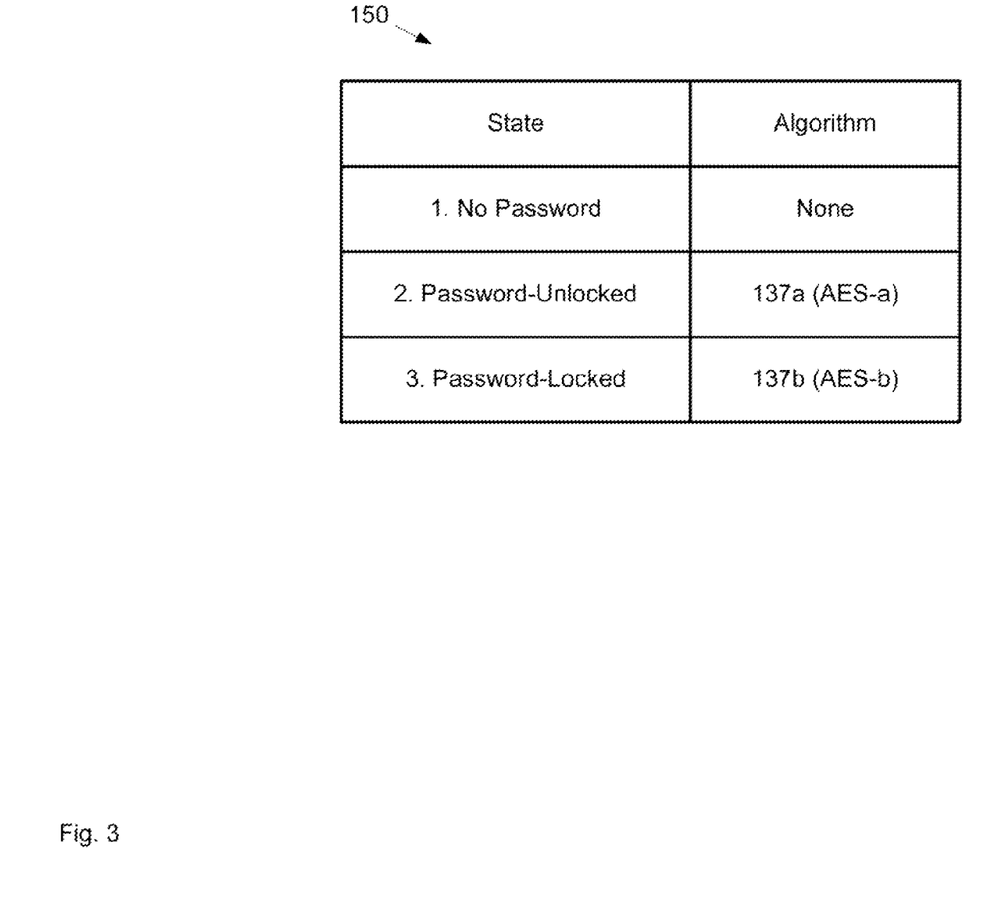
FIG. 3 depicts a table providing relationships between a state of a computing device and respective associated encryption algorithms, according to non-limiting implementations.

Attention is now directed to FIG. 3, which depicts non-limiting implementations of table 150 in which relationships between states of device 101 and algorithms 137 (e.g. security levels) are provided. For example, in a first state, no password is provided at device 101 (e.g. password protection for device 101 is not enabled). In these implementations, password 138 can be absent from device 101.

However, when password protection is enabled (e.g. via various menu options available at device 101) and device 101 is unlocked (as in the second state) algorithm 137a is used to encrypt data, such as data 145. For example, algorithm 137a can comprise an AES-a encryption algorithm and hence in the second state AES-a is enabled.

In the third state, device 101 is both locked and password protected, and algorithm 137b is used to encrypt data such as data 145. For example, algorithm 137b can comprise an AES-b encryption algorithm and hence in the third state AES-b is enabled.

Hence, application 136 is enabled to determine the state of device 101 and automatically switch to the associated algorithm 137 (or no algorithm as in the first state). For example, application 136 can determine the state of device 101 and cause table 150 to be processed to determine which of algorithms 137 to use to encrypt data.

It is further appreciated that while table 150 is depicted in rows and columns, table 150 can be in any suitable format.

Figure 4:
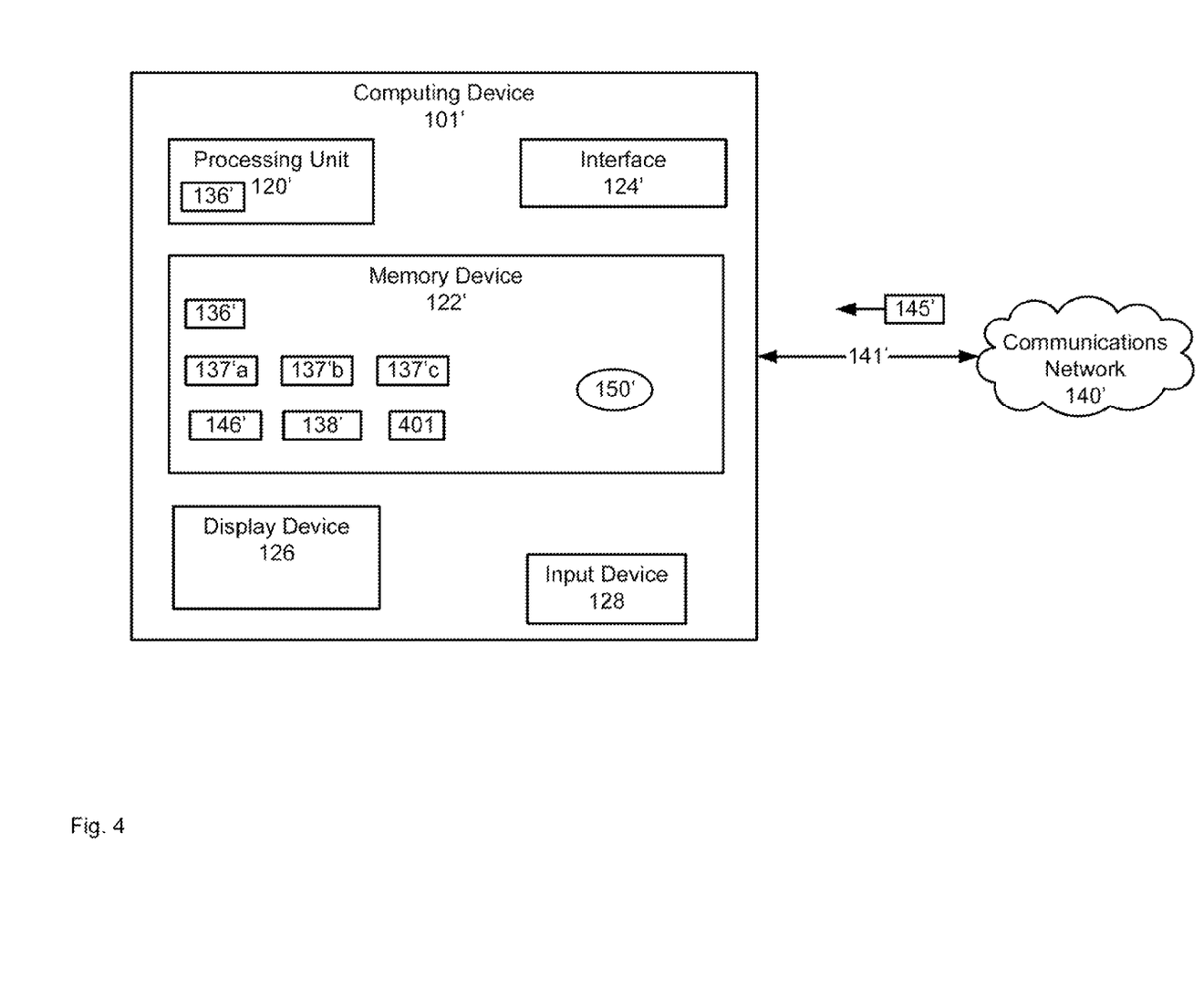
FIG. 4 depicts a computing device which can automatically switch between a plurality of security levels, according to non-limiting implementations.

Attention is now directed to FIG. 4 which depicts a device 101' similar to device 101, with like elements having like numbers however with a prime mark appended thereto. Hence processing unit 120' is similar to processing unit 120. However in device 101' levels of content protection are enabled such that a level of content protection can be specified in device 101'. For example, via a GUI (not depicted), a content protection level 401 can be specified and stored in memory 122'. For example, in specific non-limiting implementations, content protection level can be set to one of "Strong", "Stronger" and "Strongest". In the absence of application 136', the content protection level can be used to determine which of algorithms 137' to use to monolithically encrypt data (such as data 145') regardless of the state of device 101'. It is yet further appreciated that the level of content protection can further indicate the protection state device 101, for example the stronger the content protection, the weaker the protection state of device 101. It is yet further appreciated that level of content protection can also be associated with a length of an encryption key, with strong, stronger, strongest determining a length of the encryption key.

Figure 5:
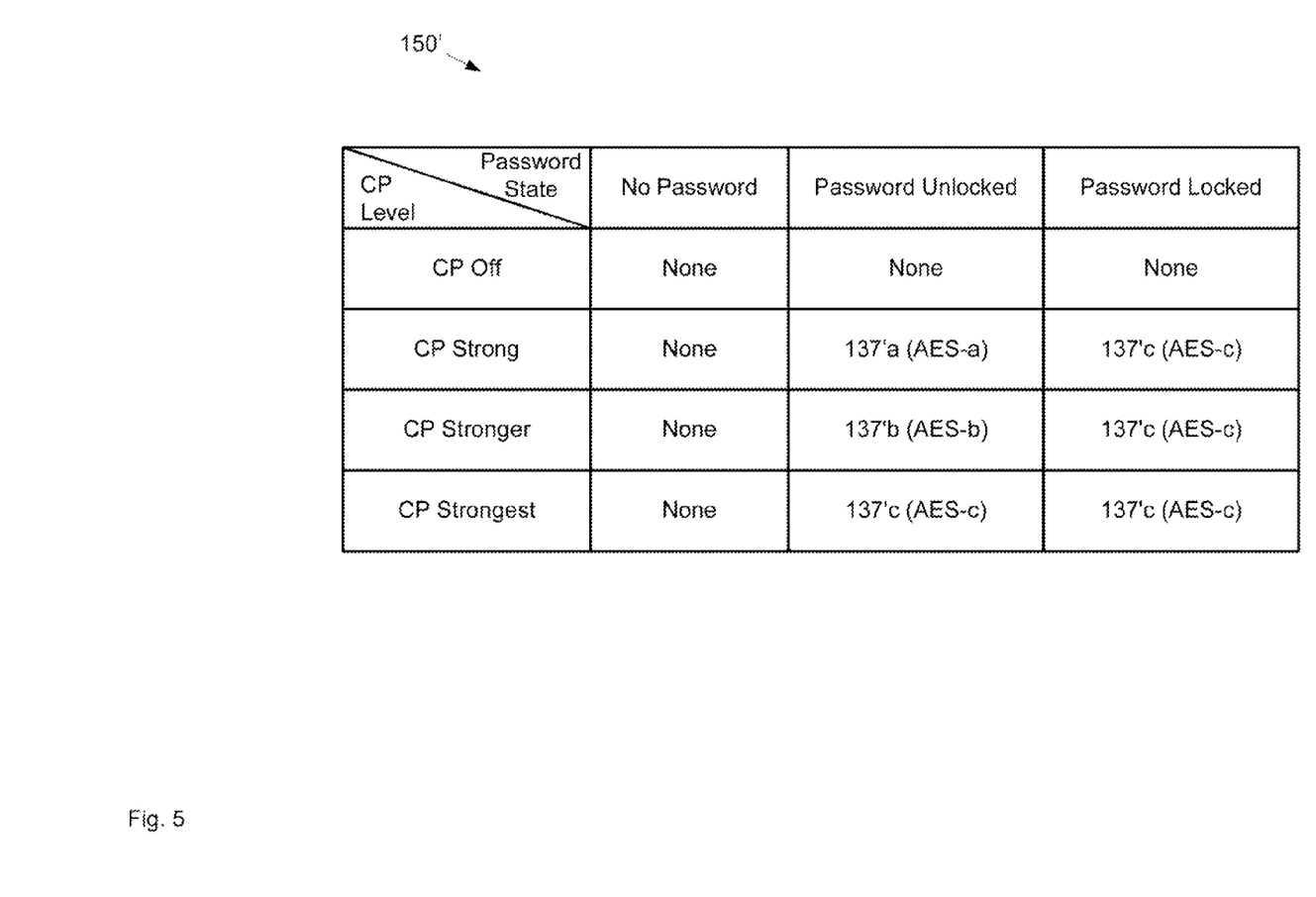
FIG. 5 depicts a table providing relationships between states of a computing device and respective associated encryption algorithms, according to non-limiting implementations.

In any event, when application 136' is processed, the security level is determined based on the state of device 101', for example according to Table 150' depicted in FIG. 5 in non-limiting implementations. It is appreciated that when content protection (CP) is off and/or there is no password, then no data is encrypted at device 101.

It is further appreciated from table 150' that when content protection is set to "Strong", password protection is enabled, and device 101 is unlocked, algorithm 137'a is automatically selected via application 136' for encrypting data. When content protection is set to "Strong", password protection is enabled, and device 101 is locked, algorithm 137'c is selected via application 136' for encrypting data.

Similarly, it is further appreciated from table 150' that when content protection is set to "Stronger", password protection is enabled, and device 101 is unlocked, algorithm 137'b is automatically selected via application 136' for encrypting data. Further, when content protection is set to "Stronger", password protection is enabled, and device 101 is locked, algorithm 137'c is automatically selected via application 136' for encrypting data.

Similarly, it is yet further appreciated from table 150' that when content protection is set to "Strongest", password protection is enabled, and device 101 is unlocked, algorithm 137'c is selected via application 136' for encrypting data. When content protection is set to "Strongest", password protection is enabled, and device 101 is locked, algorithm 137'c is selected via application 136' for encrypting data.

Hence, in these implementations several states of device 101' are used to determine a security level: a state of password protection, a state of locked or unlocked, and a state of content protection.

It is further appreciated that while table 150' is depicted in rows and columns, table 150' can be in any suitable format.

It is further appreciated that algorithms 137 associated with each state in Table 150' are generally non-limiting. For example, any of algorithms 137 could be used for a given state as long as an algorithm 137 for a given protection state provides better encryption than an algorithm 137 for a protection state that is better than the given protection state. Similarly, each algorithm 137 used for each level of content protection is generally non-limiting, though it is appreciated that for content protection being "Strongest", a minimum level of encryption can be used, for example a algorithm 137 comprising at least the AES-b algorithm described above.

Hence, in some implementations, no relational table is provided. Rather application 136 and/or application 136' is enabled to automatically cause device 101 and/or device 101' to switch to a more secure algorithm 137 when the state of device 101 and/or device 101' switches to a less secure protection state. Similarly, in these implementations, application 136 and/or application 136' is enabled to automatically cause device 101 and/or device 101' to switch to a less secure algorithm 137 when the protection state of device 101 and/or device 101' switches to a more secure protection state. In these implementations, the various possible states can be ranked according to a protection state (which can in turn be associated with a susceptibility of a hacker attack) and/or security, and automatic switching of algorithms 137 can occur accordingly. For example, when the state jumps one level in a ranking, the next more secure (or less secure as appropriate) algorithm 137 is chosen.

Furthermore, while in the preceding discussion, protection state has been referred to in relative terms, different protection states can be ranked (e.g. in table) and either assigned a value according to the ranking in order to determine whether a first protection state is better or worse than a second protection state. Alternatively, a position of a protection state in the ranking can be used to determine whether a first protection is better or worse than a second protection state.

While algorithms 137 have been presently described with reference to AES, it is appreciated that any suitable encryption algorithms are within the scope of present implementations. For example, in some implementations at least one of algorithms 137 can comprise a FIPS (Federal Information Processing Standards) certified algorithm, which can provide a higher level of security and better encryption than a non-FIPS certified algorithm, but can be slower than a non-FIPS certified algorithm. Further some FIPS encryption algorithms can include ECM, while other FIPS encryption algorithms do not. Hence, a protection state (e.g. as defined in a suitable table and/or a ranking) can each be associated with a suitable algorithm 137, each of which can be with or without ECM and FIPS certified or non-FIPS certified.

Furthermore, it is appreciated that while security levels have been described with reference to algorithms, any other type of security level is within the scope of present implantations. For example, in some implementations, the security level can be associated with different encryption keys lengths, and/or different combinations of encryption keys and/or different numbers of encryption keys and/or any other suitable type of security level.

Those skilled in the art will appreciate that in some embodiments, the functionality of devices 101, 101' can be implemented using pre-programmed hardware or firmware elements (e.g., application specific integrated circuits (ASICs), electrically erasable programmable read-only memories (EEPROMs), etc.), or other related components. In other embodiments, the functionality of devices 101, 101' can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. A method for securing a computing device, comprising:
   determining a state of said computing device, said state associated with a protection state, the determining comprising at least one of determining a current lock state or determining whether the computing device is currently password protected;
   automatically switching between a plurality of security levels at said computing device based on said state by selecting one of a plurality of encryption algorithms for encrypting data at said computing device, each successive one of said plurality of security levels associated with a respective successive one of said plurality of encryption algorithms, each successive encryption algorithm of said plurality of encryption algorithms comprising successively more electronic countermeasures than a previous encryption algorithm of said plurality of encryption algorithms.

2. The method of claim 1, wherein said determining said state of said computing device further comprises at least one of:
   determining a content protection level of said computing device;
   determining a length of a password protecting said computing device;
   determining a password attempt limit number at said computing device;
   determining a message source of a message received at said computing device;
   determining a message service associated with said computing device;
   determining whether an action associated with said computing device is associated with a business account or a personal account;
   determining a message classification of said message received at said computing device;
   determining a current IT (Information Technology) policy associated with said computing device;
   determining a current location of said computing device; or,
   determining a type of a data share currently connected to said computing device.

3. The method of claim 1, wherein protection of said computing device decreases in successive security levels, and a quantity of electronic countermeasures correspondingly increases in each said successive encryption algorithm.

4. The method of claim 3, wherein each said successive encryption algorithm is slower than a previous one of said plurality of encryption algorithms.

5. The method of claim 1, wherein a first encryption algorithm of said plurality of encryption algorithms comprises a smallest quantity of electronic countermeasures and a last encryption algorithm of said plurality of encryption algorithm comprises a largest quantify of electronic countermeasures.

6. The method of claim 1, wherein said computing device is in one of a plurality of states, and determining said state of said computing device comprises determining a current one of said plurality of states.

7. The method of claim 1, wherein each of said plurality of encryption algorithms comprises an associated AES (Advanced Encryption Standard) algorithm.

8. The method of claim 1, wherein said determining said state of said computing device comprises determining whether said computing device is locked or unlocked, and said automatically switching between said plurality of security levels on said computing device based on said state comprises:
   using a first encryption algorithm to encrypt said data at said computing device when said computing device is unlocked; and,
   using a second encryption algorithm to encrypt data when said computing device is locked, said second encryption algorithm comprising more electronic countermeasures than said first encryption algorithm.

9. The method of claim 1, wherein said computing device comprises a mobile computing device.

10. A computing device having security measures, comprising:
    a processing unit interconnected with a memory, said processing unit enabled to:
      determine a state of said computing device, said state associated with a protection state, the determining comprising at least one of determining a current lock state or determining whether the computing device is currently password protected;
      automatically switch between a plurality of security levels at said computing device based on said state by selecting one of a plurality of encryption algorithms for encrypting data at said computing device, each successive one of said plurality of security levels associated with a respective successive one of said plurality of encryption algorithms, each successive encryption algorithm of said plurality of encryption algorithms comprising successively more electronic countermeasures than a previous encryption algorithm of said plurality of encryption algorithms.

11. The computing device of claim 10, wherein said processing unit is further enabled to further determine said state of said computing device by at least one of:
    determining a content protection level of said computing device;
    determining a length of a password protecting said computing device;
    determining a password attempt limit number at said computing device;
    determining a message source of a message received at said computing device;
    determining a message service associated with said computing device;
    determining whether an action associated with said computing device is associated with a business account or a personal account; determining a message classification of said message received at said computing device;
    determining a current IT (Information Technology) policy associated with said computing device; determining a current location of said computing device; or,
    determining a type of a data share currently connected to said computing device.

12. The computing device of claim 10, wherein protection of said computing device decreases in successive security levels, and a quantity of electronic countermeasures correspondingly increases in each said successive encryption algorithm.

13. The computing device of claim 12, wherein each said successive encryption algorithm is slower than a previous one of said plurality of encryption algorithms.

14. The computing device of claim 10, wherein a first encryption algorithm of said plurality of encryption algorithms comprises a smallest quantity of electronic countermeasures and a last encryption algorithm of said plurality of encryption algorithm comprises a largest quantity of electronic countermeasures.

15. The computing device of claim 10, wherein said computing device can be in one of a plurality of states, and wherein said processing unit is further enabled to determine said state of said computing device by determining a current one of said plurality of states.

16. The computing device of claim 10, wherein each of said plurality of encryption algorithms comprises an associated AES (Advanced Encryption Standard) algorithm.

17. The computing device of claim 10, herein said processing unit is further enabled to:
    determine said state of said computing device by determining whether said computing device is locked or unlocked and,
    automatically switch between said plurality of security levels on said computing device based on said state by: using a first encryption algorithm to encrypt said data at said computing device when said computing device is unlocked; and, using a second encryption algorithm to encrypt data when said computing device is locked said second encryption algorithm comprising more electronic countermeasures than said first encryption algorithm.

18. The computing device of claim 10, wherein said computing device comprises a mobile computing device.

19. A non-transitory computer program product, comprising a computer usable medium having a computer readable program code adapted to be executed to implement instructions for securing a computing device, the instructions comprising:
    determining a state of said computing device, said state associated with protection state, the determining comprising at least one of determining a current lock state or determining whether the computing device is currently password protected;
    automatically switching between a plurality of security levels at said computing device based on said state by selecting one of a plurality of encryption algorithms for encrypting data at said computing device, each successive one of said plurality of security levels associated with a respective successive one of said plurality of encryption algorithms, each successive encryption algorithm of said plurality of encryption algorithms comprising successively more electronic countermeasures than a previous encryption algorithm of said plurality of encryption algorithms.

* * * * *